US009785917B2

United States Patent
Adams et al.

(10) Patent No.: US 9,785,917 B2
(45) Date of Patent: Oct. 10, 2017

(54) SYSTEM AND METHOD FOR OBTAINING A PORTION OF AN ARCHIVED EMAIL MESSAGE

(75) Inventors: Neil Patrick Adams, Kitchener (CA); Van Quy Tu, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 323 days.

(21) Appl. No.: 12/806,591

(22) Filed: Aug. 17, 2010

(65) Prior Publication Data

US 2012/0047212 A1 Feb. 23, 2012

(51) Int. Cl.
*G06Q 10/10* (2012.01)

(52) U.S. Cl.
CPC .................. *G06Q 10/107* (2013.01)

(58) Field of Classification Search
CPC .................................................. G06Q 10/107
USPC ....................................................... 709/206
See application file for complete search history.

(56) References Cited

U.S. PATENT DOCUMENTS

| | | | | | |
|---|---|---|---|---|---|
| 6,397,261 | B1* | 5/2002 | Eldridge | ........... | G06F 17/30011 707/E17.008 |
| 7,287,058 | B2* | 10/2007 | Loveland | ............. | G06Q 10/107 709/206 |
| 7,392,289 | B2 | 6/2008 | Curry et al. | | |
| 7,536,440 | B2* | 5/2009 | Budd | .................. | G06Q 10/107 709/203 |
| 8,073,822 | B2* | 12/2011 | Sell | ..................... | G06Q 10/107 707/692 |
| 8,156,188 | B1* | 4/2012 | Derhak | ................ | G06Q 10/107 709/206 |
| 8,856,241 | B1* | 10/2014 | Derhak | .................. | H04L 51/00 709/206 |
| 8,930,464 | B1* | 1/2015 | Mace | .................. | G06Q 10/107 709/202 |
| 2002/0119804 | A1* | 8/2002 | Gomes | ................ | G06Q 10/107 455/557 |
| 2002/0194307 | A1* | 12/2002 | Anderson | ........... | H04L 63/1408 709/219 |
| 2003/0191689 | A1 | 10/2003 | Bosarge et al. | | |
| 2005/0027781 | A1 | 2/2005 | Curry et al. | | |
| 2005/0044183 | A1* | 2/2005 | Meunier | ................ | G06Q 10/10 709/219 |
| 2006/0031357 | A1 | 2/2006 | Misra et al. | | |
| 2007/0067399 | A1* | 3/2007 | Kulkarni et al. | ............. | 709/206 |
| 2007/0180033 | A1* | 8/2007 | Singh | .................. | G06Q 10/107 709/206 |
| 2007/0286159 | A1 | 12/2007 | Preiss et al. | | |

(Continued)

OTHER PUBLICATIONS http://www.quest.com/archive-manager/; Quest Software, Email Archiving Software and eDiscovery Support, 4 pgs, Sep. 27, 2010; Chicago, 4320 Winfield Road, Suite 500, Warrenville, IL 60555.

(Continued)

*Primary Examiner* — Jerry Dennison
(74) *Attorney, Agent, or Firm* — Thomas Grzesik; Fleit Gibbons Gutman Bongini & Bianco, P.O.

(57) ABSTRACT

A first email message associated with a mobile communication device of a user is conveyed to a destination. The first email message comprises a forwarded portion of a second email message that has been previously archived by an email server associated with the user. The step of conveying comprises the step of obtaining the forwarded portion of the second email message without intervention of the user.

12 Claims, 3 Drawing Sheets

(56) References Cited

U.S. PATENT DOCUMENTS

| | | | |
|---|---|---|---|
| 2008/0016169 A1* | 1/2008 | Kaghazian | 709/206 |
| 2008/0033905 A1 | 2/2008 | Stokes | |
| 2008/0034049 A1 | 2/2008 | Stokes | |
| 2008/0052284 A1 | 2/2008 | Stokes et al. | |
| 2008/0155035 A1* | 6/2008 | Reddy et al. | 709/206 |
| 2009/0228564 A1* | 9/2009 | Hamburg | G06Q 10/107 709/206 |

OTHER PUBLICATIONS

Unknown author; "Symantec Enterprise Vault: New Features for Enterprise Vault 8.0," from http://www.symantec.com/business/enterprise-vault; no later than Dec. 31, 2009; 1 page.

Unknown author; "Symantec Enterprise Vault: Agents & Options," from http://www.symantec.com/business/products/agents_options.jsp?pcid=pcat_business_cont&pvid=; no later than Dec. 31, 2009; 1 pages.

Kloster, Dennis et al.; "Mobile Search: EV 8: Backup and Archiving: Enterprise Vault Forum," from http://www.symantec.com/connect/forums/mobile-search-ev-8; published no earlier than Feb. 9, 2009 and no later than Jun. 17, 2009; 2 pages.

Messenger, David et al.; "Wish List: Backup and Archiving: Enterprise Vault Forum," from http://www.symantec.com/connect/forums/wish-list; published no earlier than Nov. 23, 2005 and no later than Jun. 21, 2009; 8 pages.

Bhaskar, Savitha et al.; "Can Blackberry Users Download EV Shortcuts From their Mailbox?" from http://www.symantec.com/connect/fourms/can-blackberry-users-download-ev-shortcuts-their-mailbox; published no earlier than later than Oct. 2, 2006 and no later than Jun. 25, 2009; 1 page.

Michelz; "EV Wish List—Summary," from http://www.symantec.com/connect/forums/ev-wish-list-summary-do-not-reply; published no later than Aug. 26, 2008; 3 pages.

Canadian Office Action dated Apr. 25, 2017, received for Canadian Application No. 2,895,921.

* cited by examiner

SYSTEM AND METHOD FOR OBTAINING A PORTION OF AN ARCHIVED EMAIL MESSAGE

TECHNICAL FIELD

The invention relates generally to email transmission from mobile communication devices and more particularly to email transmission of archived emails.

BACKGROUND

As mobile communications devices (MCD) like the Blackberry become more common, subscribers use these devices more often for common applications like email. Emails may be downloaded locally to the mobile communication device for viewing by a subscriber, leaving a copy of the email on an email server.

In order to control the size of email inboxes, mail servers can be configured to archive email messages that meet certain criteria, such as a timestamp associated with the email, whether the email has file attachments, etc. When an email message is archived, the email message is copied to an archive server and a condensed or "summary" copy can be left in the subscriber's inbox as a reference to the archived email. The summary copy can be used to retrieve the full email message from the archive server.

However, with mobile communication devices that maintain a local copy of emails (i.e., distinct from the copy on the email server), there is no way for the mobile communication device (or the subscriber) to know when an email message has been archived. An email generated by forwarding or replying to an archived email message that is based on a local copy (which has not been condensed) can be missing portions of the original email message, for example, only the summary copy is forwarded.

DESCRIPTION OF THE DRAWINGS

Features of example implementations of the invention will become apparent from the description, the claims, and the accompanying drawings in which:

DETAILED DESCRIPTION

Described herein is a system and method for conveying a first email message that comprises a portion of a second, archived email message where the first email message is sent by a user of a mobile communication device. The user may forward or reply to the archived email message without performing additional tasks related to obtaining the archived email message. Previous solutions required additional steps by the user with specialized software adapted to search for the archived message. The user then had to "copy and paste" or "drag and drop" the archived message into a new message to obtain the full body of the archived message.

In a first implementation, a first email message associated with a mobile communication device of a user is conveyed to a destination. The first email message comprises a forwarded portion of a second email message that has been previously archived by an email server associated with the user. The step of conveying comprises the step of obtaining the forwarded portion of the second email message without intervention of the user.

In a second implementation, a mobile communication device is configured to convey a first email message to a destination. The first email message comprises a forwarded portion of a second email message that has been previously archived by an email server associated with a user of the mobile communication device. The mobile communication device is configured to obtain the forwarded portion of the second email message without intervention of the user.

In a third implementation, a mobile interface server is configured to convey a first email message associated with a mobile communication device of a user to a destination. The first email message comprises a forwarded portion of a second email message that has been previously archived by an email server associated with the user. The mobile interface server is configured to obtain, without intervention of the user, the forwarded portion of the second email message.

Figure 1:
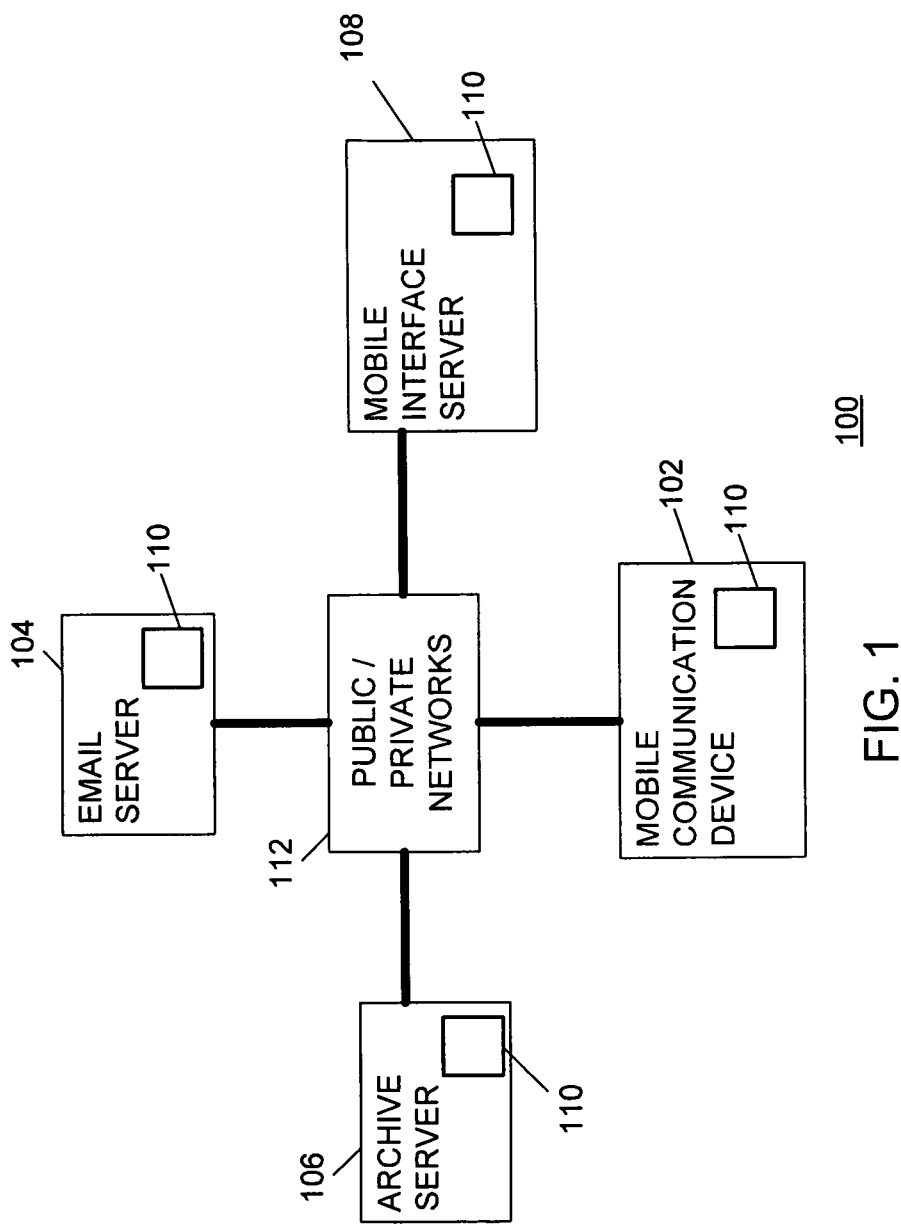
FIG. 1 is a block diagram representation of one implementation of a system that comprises a mobile communication device, an email server, an archive server, and a mobile interface server.

Turning to FIG. 1, a system 100 in one example comprises a mobile communication device 102, an email server 104, and an archive server 106. In alternate implementations, the system 100 may further comprise a mobile interface server 108. One or more of the mobile communication device 102, the email server 104, the archive server 106, and the mobile interface server 108 may comprise one or more instances of a recordable data storage medium 110, as described herein.

The mobile communication device 102 in one example comprises a Blackberry device, smart phone, wireless personal digital assistant (PDA), or other email-enabled user equipment (UE) device. The mobile communication device 102 is configured to access an email or electronic messaging account stored on the email server 104. Examples of the email server 104 comprise an enterprise server, application server, computer cluster, or other computer device(s) that provide sending and receiving capabilities for email. The email server 104 may run software such as a Microsoft Exchange, Lotus Domino, Novell GroupWise, or other email programs, as will be appreciated by those skilled in the art.

The email server 104 comprises electronic storage for user accounts, emails, attachments, contacts, calendar events, and other data. The archive server 106 in one example provides a separate storage space from the email server 104. The archive server 106 is configured to store emails or other data from the email server 104 to reduce storage requirements of the email server 104. The archive server 106 in one example provides an archiving functionality to the email server 104. For example, the archive server 106 may run an email archiving software program such as Symantec Enterprise Vault, GFI MailArchiver, or Quest ArchiveManager. Alternate implementations of the email server 104 and the archive server 106 will be apparent to those skilled in the art.

One or more of the mobile communication device 102, email server 104, archive server 106, or the mobile interface server 108 may comprise an archive status for email messages or other data associated with the email server. For example, when an email message is archived from the email server 104 to the archive server 106, the archive status provides a local variable for determining the location of the full message. This local variable may be shared with other components of the system 100 as needed.

The mobile interface server 108 in one example is configured as a relay for communications to provide message redirection and data synchronization between the mobile communication device 102 and the email server 104. In a further example, the mobile interface server 108 is configured to communicate with the archive server 106. The mobile interface server 108 may comprise a Blackberry Enterprise Server (BES) or other mobile device management server.

Elements of the system 100 may be communicatively coupled by various communication links such as private networks, public networks (i.e., the Internet), wireless local area networks (WLAN), cellular networks, other wired or wireless communication networks and combinations thereof, collectively shown as public/private networks 112. For example, the mobile communication device 102 may communicate wirelessly to a base station of a cellular network, through the Internet, and then to a private enterprise network that contains the email server 104. Communication between the elements of system 100 may be performed using standard protocols (such as TCP/IP) or built-in application programming interfaces such as ActiveSync. In other implementations, software plugins, add-ons, or updates may be installed to any of the mobile communication device 102, email server 104, archive server 106, or mobile interface server 108 to allow communication between each other. Additional communication links, protocols, and application programming interfaces will be apparent to those skilled in the art.

Figure 2:
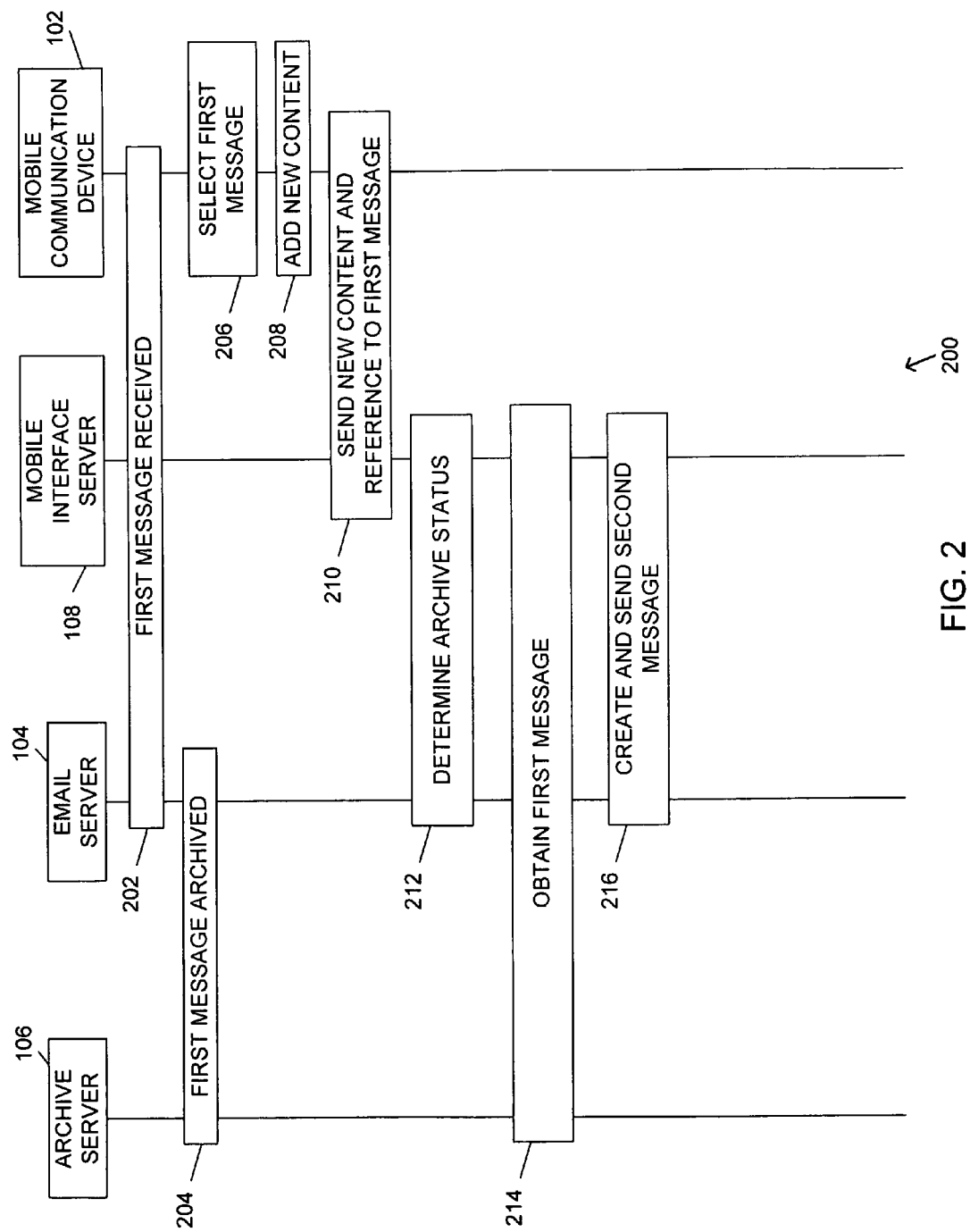
FIG. 2 is a representation of one message flow for forwarding an archived message by the mobile interface server of the system of FIG. 1.

An illustrative description of operation of the system 100 is presented, for explanatory purposes. Turning to FIG. 2, a message flow 200 shows one implementation of conveying an archived message. The email server 104 receives (block 202) a first email message and communicates the first email message to the mobile communication device 102. In a further example, the mobile interface server 108 cooperates with the email server 104 to transfer the first email message to the mobile communication device 102. The email server 104 and the archive server 106 cooperate to archive (block 204) the first email message. For example, the email server 104 retains a summary copy of the first email message but the original message is stored by the archive server 106 and also by the mobile communication device 102, as will be understood by those skilled in the art.

If the user wishes to forward a copy of the first email message or a portion thereof, the user of the mobile communication device 102 selects (block 206) the first email message to be forwarded and may optionally add (block 208) new content for creation of a second, forwarded message. In this implementation, the mobile communication device 102 does not send the entire first email message and new content to the email server 104, but instead sends the new content along with a reference, pointer, or shortcut to the first email message. The reference allows for less data to be transferred from the mobile communication device 102 over wireless communication paths, which are generally more expensive and limited in their bandwidth.

The mobile communication device 102 sends (block 210) the new content and the reference to the first email message to the mobile interface server 108. The mobile interface server 108 determines (block 212) an archive status of the first email message. For example, the mobile interface server 108 communicates with the email server 104 to determine whether the first email message has been archived. In this example, the first email message has been archived and mobile interface server 108 communicates with the archive server 106 to obtain (block 214) the first email message. The mobile interface server 108 then creates and sends (block 216) a second, forwarded message that includes the new content along with the first email message, or a portion thereof. For example, the mobile interface server 108 creates a forwarded message with the new content prepended to the first email message. In this example, the mobile interface server 108 obtains the first email message from the archive server without restoring the first email message to the email server 104 or restoring the first email message to the mobile communication device 102.

In the embodiment of the message flow 200 of FIG. 2, the blocks associated with the mobile communication device 102 (i.e., blocks 202, 206, 208, and 210) occur without a modification for the archive status of the first email message. Advantageously, the system 100 and the message flow 200 provide for obtaining the first email message (or a portion thereof) from the archive server 106 without intervention from the user of the mobile communication device 102. For example, actions taken by the user to forward an archived email message are substantially the same as those actions taken to forward an email message that has not been archived. Accordingly, the user of the mobile communication device 102 need not know that the first email message has been archived. In an alternate embodiment of the message flow 200 where the mobile interface server 108 is not present, the email server 104 communicates directly with the mobile communication device 102 and performs the steps associated with the mobile interface server 108.

Figure 3:
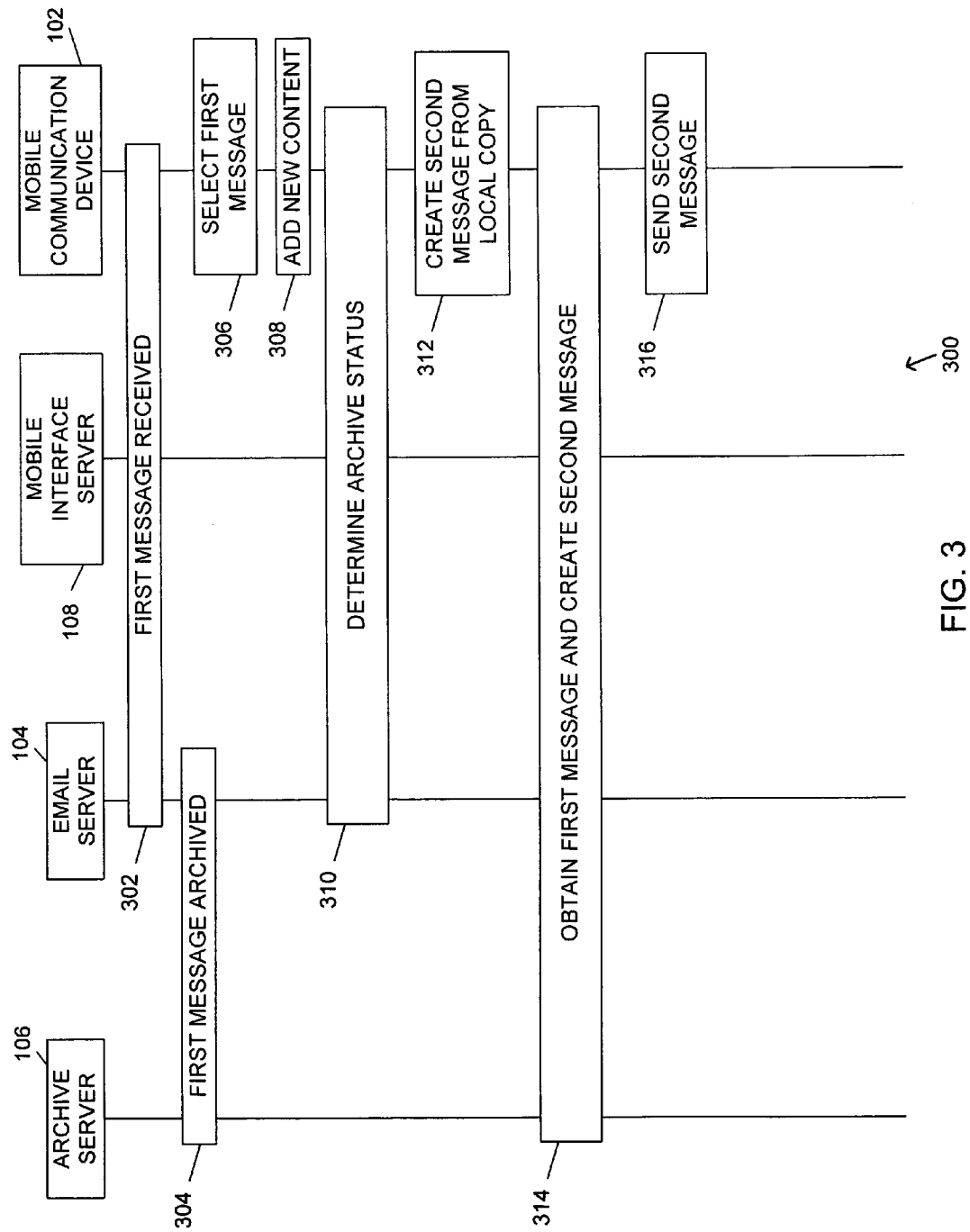
FIG. 3 is a representation of one message flow for forwarding an archived message by the mobile communication device of the system of FIG. 1.

Turning to FIG. 3, a message flow 300 shows another implementation of forwarding an archived message. The first email message in one example is received (block 302) by the email server 104 and communicated to the mobile communication device 102. In a further example, the mobile interface server 108 cooperates with the email server 104 to transfer the first email message to the mobile communication device 102. The email server 104 and the archive server 106 cooperate to archive (block 304) the first email message. For example, the summary copy of the first email message is retained by the email server 104 but the original message is stored by the archive server 106 and the mobile communication device. Optionally, the email server 104 may cooperate with the mobile interface server 106 to push an archive status update to the mobile communication device 102, as described herein.

The user of the mobile communication device 102 selects (block 306) the first email message to be forwarded and adds (block 308) new content for the forwarded message. The mobile communication device 102 then determines (block 310) the archive status of the first email message. In a first example, the mobile communication device 102 requests the archive status from the email server 104. In a second example, the mobile communication device 102 requests the archive status from the mobile interface server 108, which then requests the archive status from the email server 104 on behalf of the mobile communication device 102. In a third example where the archive status has been pushed to the mobile communication device 102 by the email server 104, the mobile communication device 102 checks a local memory (i.e., within the recordable data storage medium 110) for the archive status.

Upon a determination that the first email message has been archived, the mobile communication device 102 in a first example uses a local copy of the first email message to create (block 312) a forwarded message with the new content. In a second example, the mobile communication device 102 obtains (block 314) the first email message from the archive server 106. In a further example, within block 314 the mobile communication device 102 requests the first email message from the mobile interface server 108, which obtains the first email message on behalf of the mobile communication device 102. The mobile communication device 102 then sends (block 316) the second message with the new content to the email server 104.

The system 100 in one example comprises a plurality of components such as one or more of electronic components, hardware components, and computer software components. A number of such components can be combined or divided in the system 100. An example component of the system 100 employs or comprises a set or series of computer instructions written in or implemented with any of a number of programming languages, as will be appreciated by those skilled in the art.

The system 100 in one example employs one or more computer-readable signal-bearing media. The computer-readable signal-bearing media store software, firmware or assembly language for performing one or more portions of one or more implementations of the invention. Examples of a computer-readable signal-bearing medium for the apparatus 100 comprise the recordable data storage medium 110 of the mobile communication device 102, the email server 104, the archive server 106, and the mobile interface server 108. The computer-readable signal-bearing medium for the system 100 in one example comprise one or more of a magnetic, electrical, optical, biological, and atomic data storage medium. For example, the computer-readable signal-bearing media comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, by a mobile interface server, comprising:
receiving content to be added to a first email message and a reference to a second email message from a mobile communication device of a user, the reference identifying the second email message and indicates that at least a portion of the second email message is to be forwarded as part of the first email message, the second email message being archived by an email server that is external to the mobile interface server, wherein archiving of the second email message comprises storing the second email message in its original form at an archive server and maintaining only a summary version of the second email message at the email server, and wherein the archive server is external to the email server and the mobile interface server;
determining, in response to receiving the content, that the second email message has been archived at the archive server;
obtaining, without user intervention, at least a portion of the second email message from the archive server in response to determining that the second email message has been archived at the archive server;
generating the first email message, the first email message comprising at least the content and a forwarded portion of the second email message, the forwarded portion of the second email message including the at least a portion of the second email message; and
conveying the first email message to a destination.

2. The method of claim 1, wherein the conveying comprises:
sending the first email message as a forwarded message of the second email message.

3. The method of claim 1, wherein the obtaining comprises:
obtaining the at least a portion of the second email message without restoring the second email message to the email server.

4. The method of claim 1, wherein the mobile interface server is configured to relay communications between the mobile communication device and the email server.

5. The method of claim 1, wherein determining that the second email message has been archived at the archive server comprises:
determining, without intervention of the user, an archive status of the second email message.

6. The method of claim 5, wherein determining the archive status comprises:
requesting the archive status of the second email message from the email server.

7. The method of claim 5, further comprising:
pushing an archive status update to the mobile communication device after archiving the second email message, wherein the archive status update indicates that the second email message has been archived.

8. The method of claim 7, wherein pushing the archive status update comprises:
receiving the archive status update from the email server.

9. The method of claim 1, wherein the obtaining comprises
obtaining the at least a portion of the second email message from a local memory of the mobile communication device.

10. An apparatus, comprising:
a mobile interface server configured to:
receive content to be added to a first email message and a reference to a second email message from a mobile communication device of a user, the reference identifying the second email message and indicates that at least a portion of the second email message is to be forwarded as part of the first email message, the second email message archived by an email server that is external to the mobile interface server, wherein archiving of the second email message comprises storing the second email message in its original form at an archive server and maintaining only a summary version of the second email message at the email server, and wherein the archive server is external to the email server and the mobile interface server;
determine, in response to the content having been received, that the second email message has been archived at the archive server;
obtain, without user intervention, at least a portion of the second email message from the archive server in response to determining that the second email message has been archived at the archive server;
generate the first email message, the first email message comprising at least the content and a forwarded portion of the second email message, the forwarded portion of the second email message including the at least a portion of the second email message; and convey the first email message to a destination.

11. The apparatus of claim 10, wherein the mobile interface server is configured to determine an archive status of the second email message.

12. A method, by a mobile communication device, comprising:

receiving content to be added to a first email message and a reference to a second email message, the reference identifying the second email message and indicates that at least a portion of the second email message is to be forwarded as part of the first email message, the second email message being archived by an email server, wherein archiving of the second email message comprises storing the second email message in its original form at an archive server and maintaining only a summary version of the second email message at the email server, and wherein the archive server is external to the email server and the mobile interface server;

analyzing, in response to receiving the content, an archive status variable associated with the second email message;

determining, in response to analyzing the archive status variable, that the second email message has been archived at the archive server;

obtaining, without user intervention, at least a portion of the second email message from the archive server in response to determining that the second email message has been archived at the archive server;

generating the first email message, the first email message comprising at least the content and a forwarded portion of the second email message, the forwarded portion of the second email message including the at least a portion of the second email message; and conveying the first email message to a destination.

* * * * *